Jan. 9, 1940.  M. BERGER  2,186,662
CONTINUOUSLY VARIABLE FRICTION WHEEL CHANGE SPEED GEAR
Filed Aug. 15, 1936  5 Sheets-Sheet 2
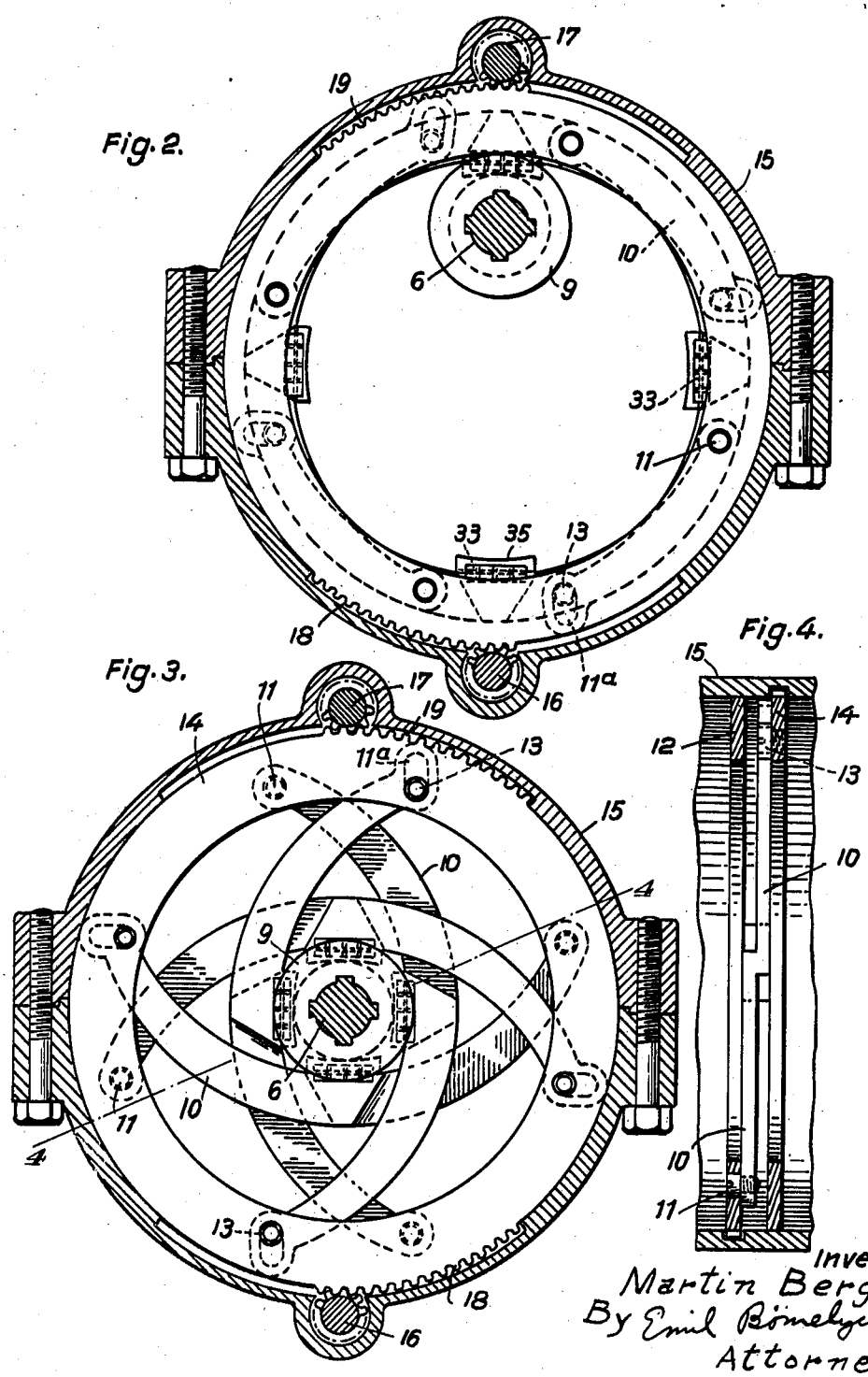

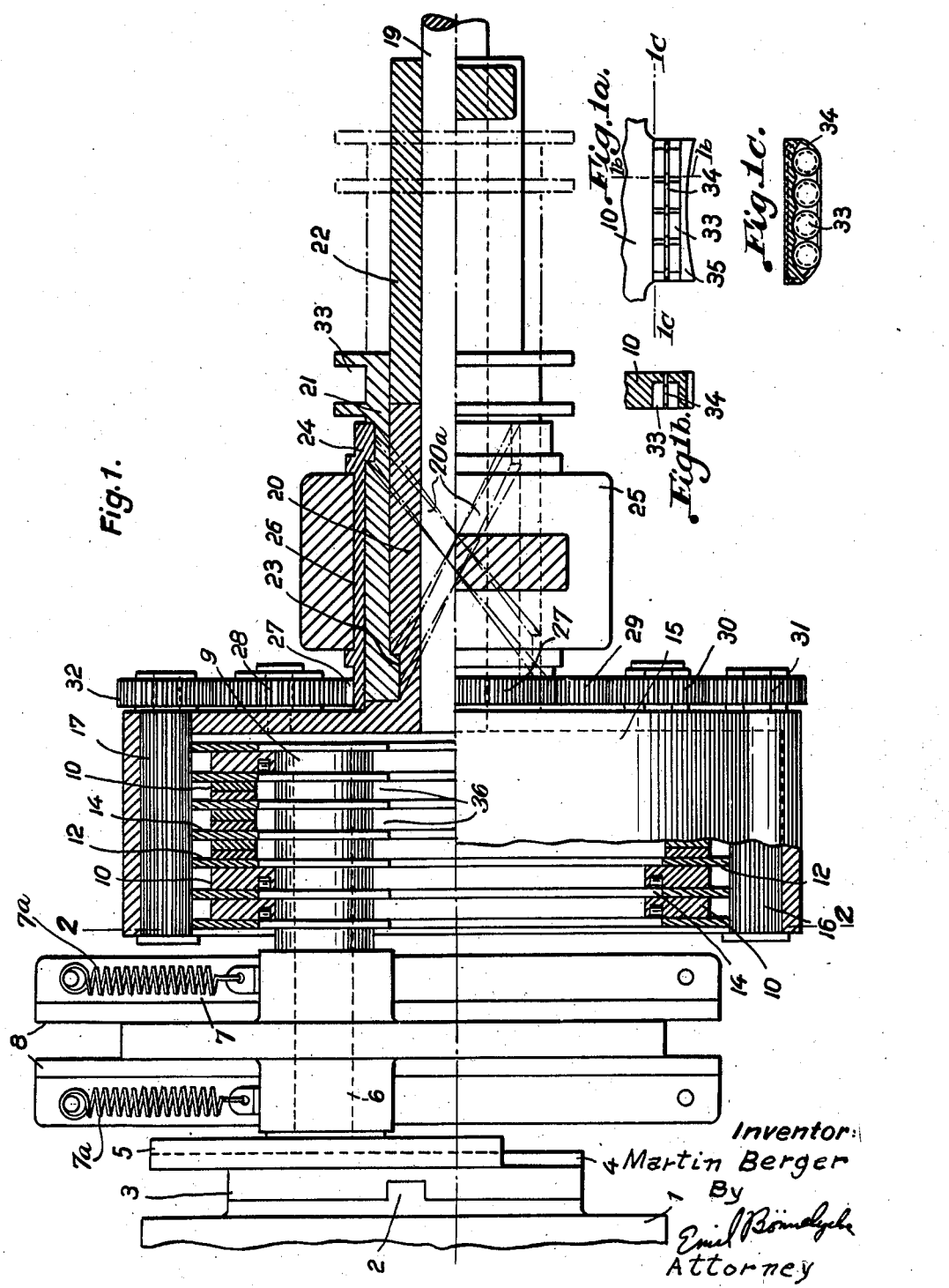

Jan. 9, 1940.    M. BERGER    2,186,662
CONTINUOUSLY VARIABLE FRICTION WHEEL CHANGE SPEED GEAR
Filed Aug. 15, 1936    5 Sheets-Sheet 3

Inventor:
Martin Berger
By Emil Bönnelycke
Attorney

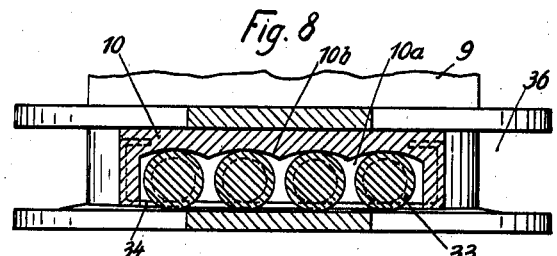
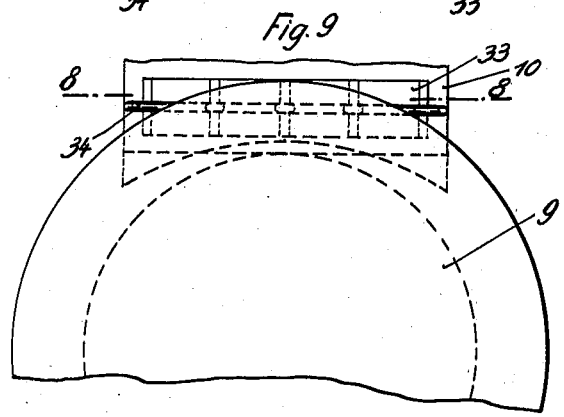
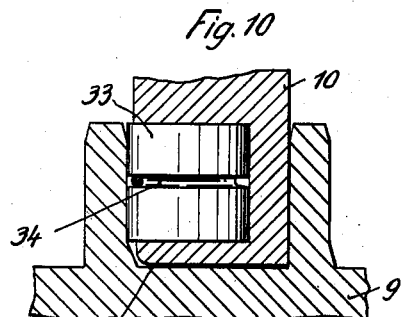
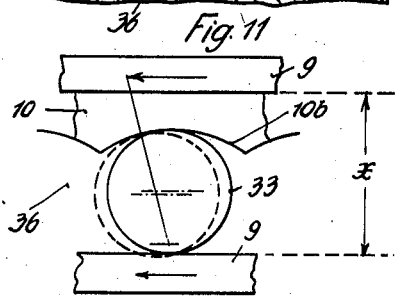

Patented Jan. 9, 1940

2,186,662

UNITED STATES PATENT OFFICE 2,186,662

CONTINUOUSLY VARIABLE FRICTION WHEEL CHANGE SPEED GEAR

Martin Berger, Dresden-Freital, Germany

Application August 15, 1936, Serial No. 96,283
In Germany August 16, 1935

11 Claims. (Cl. 74—112)

Adjustable transmission gears are already known in which a rotating spur-wheel engages with a spur-wheel adjustable in diameter. These gears have the disadvantage that they are not continuously variable, since the adjustment of the variable toothed rim must always take place by the amount of at least one whole tooth division.

Contrary hereto, with friction wheel gears a continuous variation can be attained. The friction wheel gears hitherto known, however, generally use conical wheels which are shifted axially with respect to each other so that the diameters in contact vary. These gears have again the disadvantage that an axial displacement is necessary and in consequence of the only slight frictional engagement no considerable forces can be transmitted, whilst there is considerable slip.

The present invention obviates these disadvantages and provides a continuously variable friction wheel gear which does not present the said disadvantages. To this end, one of the two friction wheels is made adjustable in its diameter by being composed of friction shoes which are arranged on arms adjustable in the manner of an iris diaphragm. The arms lie in a number of layers parallel to each other and behind each other in the direction of the axis, and are hinged on rings by the rotation of which the adjustment of the friction rim takes place.

For the rotation of the rings, these can be provided on their outer periphery with teeth and in these teeth there engages for the forward rotation on the one hand, and for the backward rotation on the other hand, for each movement a common toothed wheel carried in the ring housing and both toothed wheels are adjusted in countermovement by a common toothed wheel. A further rotation of the two rings with respect to each other is obtained by the ring groups by the contrary rotation of which the friction rim is adjusted being each brought into connection with a toothed wheel or toothed segment and the toothed segments meshing exactly in the central axis of the rings, with each other, so that a rotation of the one group of rings in the one direction must always correspond to a rotation of the other ring group in the opposite direction.

The accompanying drawings show by way of example two embodiments of the invention:

Figure 1 is a side view of the gear partly in section,

Figure 1a is a partial side view of the lever 10 shown in Fig. 1 with the friction rollers. Figure 1b is a section through Fig. 1a taken on line 1b—1b thereof. Figure 1c is a section through Fig. 1a taken on line 1c—1c thereof.

Figures 2 and 3 are similar cross-sections through Figure 1 in two different positions, the greatest ratio of transmission being shown in Figure 2, whilst with the position according to Figure 3, the two shafts run at the same speed, and the section of Figure 2 being taken on line 2—2 of Figure 1, Figure 4 is a section through Figure 3 taken on line 4—4 of Figure 3 after removal of the rotating body and shows an individual friction rim lever and its connection with the rings.

Figure 6 is a plan of Figure 5, omitting the cover and the arms arranged between the rings.

Figure 7 is a similar section to Figure 5 but showing the parts in the position where the adjustable friction wheel has the smallest diameter, and Figures 8 to 11 illustrate and explain the coupling and uncoupling feature in which Fig. 8 is a sectional view taken on line 8—8 of Fig. 9 of which the latter is a plan view, Fig. 10 is a sectional view of a detail and Fig. 11 is a diagrammatic view.

Figure 5:
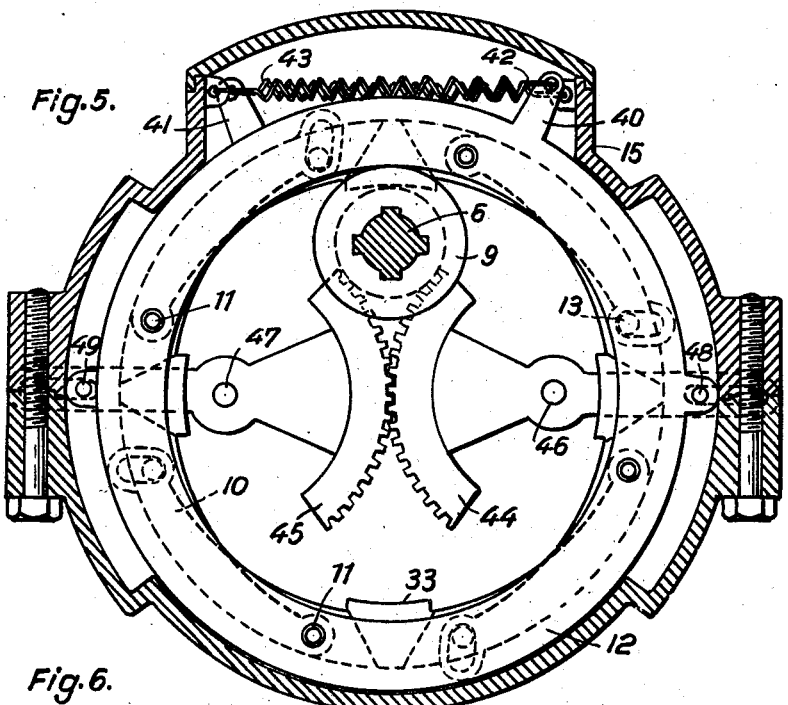
Figures 5–7 show a further embodiment of the gear for adjusting the friction wheel, Figure 5 being a section through the gear in the position in which the adjustable friction wheel has its greatest diameter.

On the drawings, 1 is a disc in connection with the driving shaft which engages by a strip 2 running radially in a corresponding groove of an intermediate disc 3. The intermediate disc has a strip 4 which also runs radially and at right angles to the strip 2 and fits into a corresponding groove of a disc 5 which is firmly arranged on an axle 6. By means of this connection, there exists between the driving shaft and the axle 6 a permanently fixed coupling which, however, permits a radial shifting of the two axes with respect to each other. The axle 6 is carried in a bearing body 7 which is movable in two guides 8 in the direction of a diameter and the axle 6 itself carries the rotating body 9.

The friction rim is formed of a number of levers 10 which are arranged oscillatably about axes 11, on rings 12. The rings 12 are rotatably carried in a housing 15. On the ends opposite to the point of oscillation 11 the levers 10 are provided with slots 11a with which they fit over pins 13. The latter are mounted on rings 14 which are alternately fitted with rings 12 in the housing 15. The rings 14 are also rotatable in the housing 15. Toothed wheels 16 and 17 which mesh in teeth 18 or 19 on the rings serve for the rotation of the rings 12 or 14. The rings 12 are provided with the teeth 18, and the rings 14 with the teeth 19, and if the two toothed wheels 16 and 17 are rotated in opposite directions, then the rings 12 and 14 are also oppositely rotated and thus in the manner of a diaphragm in photographic apparatus the levers 10 are oscillated inward and outward. Figure 2 shows the levers in the extreme outward position whilst in Figure 3 they are oscillated into the extreme inward position.

A series of levers 10 are arranged adjacently to each other, in the example shown there are six rows, and in each row four levers are provided. The individual levers are, as shown by Figure 4, made bent, that is, their two ends are in different planes with respect to each other so that they can overlap each other, space being thus saved in the axial direction. A sleeve 21 arranged on the boss 20 of the housing 15 and movable in the axial direction, serves for the rotation of the two toothed wheels 16 and 17. The boss 20 on which follows the bearing 22 for the driven shaft 19 is firmly mounted on the shaft 19 and rotates with this. On the outside of the boss 20 is turned a spiral thread 20a which is represented in the drawings by a broken line, and in which a tooth 23 or the like on the sleeve 21 engages. The sleeve 21 itself is again provided on its outside with a spiral thread in which a tooth 24 of a sleeve 26 arranged in the bearing 25, engages. The sleeve 26 is provided with teeth 27 on its end turned towards the housing 15, and these teeth engage in two spur-wheels 28 and 29. The last-mentioned spur-wheel engages through a further spur-wheel 30 with a spur-wheel 31 on the shaft of the spur-wheel 16, whilst the spur-wheel 28 meshes directly with a spur-wheel 32 which is arranged coaxially with the spur-wheel 17. If the sleeve 21 which is provided with a groove 133 to take an adjusting lever is shifted in the axial direction, for example out of the position shown in Figure 1 of the drawings, into the dotted line position, then in consequence of the sliding of the tooth 23 along the spiral thread, the sleeve 21 will rotate with respect to the boss 20. In this rotation it carries the sleeve 26 with it but the sleeve 26 will however carry out in addition a further rotation since at the same time the tooth 24 on the sleeve 26 also moves in the spiral thread arranged on the outer circumference of the sleeve 21. There are arranged two teeth 23, 24 and two spiral threads in order to attain a comparatively large rotation in spite of a very flat pitch of the spiral thread. The pitch of the spiral thread must be very small in order to attain a self-locking action. On the rotation of the sleeve 26, the two toothed wheels 28 and 29 are carried therewith and these transmit the rotation on to two spur-wheels 16 and 17 which in consequence of the intermediate wheel 30 carry out opposite rotations and thereby oppositely rotate the rings 12 and 14 in the abovementioned manner and carry the levers 10 out of the position according to Figure 2 into the position according to Figure 3, and back again.

Friction rollers 33 are carried on the levers 10. The rollers are located individually on curved surfaces in recesses of the lever 10, and are held by a ring 34 running round them. The projection on the levers 10 in which the rollers are carried, terminates at the bottom in a semi-circularly rounded foot 35.

The projection of the levers 10 with the rollers 33 engages in corresponding grooves 36 of the rotating body 9. When, after the engagement of the rollers in a groove, there takes place a movement of the rotating body, the rollers, in consequence of the curved surfaces of application become firmly clamped in the groove of the rotating body and are carried along thereby.

Finally, there are also provided springs 7a by means of which the bearing 7 with the shaft 6 is constantly forced outward in the radial direction, that is, upward in Figure 1.

The method of operation of the device is consequently as follows: When the parts take up the position shown in Figures 1 and 2, then the axle of the friction body 9 is shifted radially to the maximum extent outwards, and the levers 10 are fully rotated outwards, so that the friction rim has its maximum diameter. In Figure 2 there are only four levers 10 to be seen, which engage in a groove of the revolving body; these four levers form one row. As already mentioned six rows of levers are provided, and therefore the friction body 9 is provided with six adjacent grooves, one for each row of levers. The shoes 35 of the levers of the different rows are displaced relatively to each other with respect to the periphery of the housing 15 so that an uninterrupted engagement of the friction rim with the revolving body 9 is ensured. In this position of the parts the speed of rotation of the driving shaft 1 will be reduced in a ratio corresponding to the ratio of the diameter of the revolving body to the diameter of the friction rim. The driven shaft 19 will thus run correspondingly slower, in the example shown in the ratio of 1:3. If now, and this can take place during the running of the device, the sleeve 21 is moved axially, then the levers 10 are correspondingly contracted inwardly. The diameter of the friction rim is thereby continuously reduced, and the speed of rotation of the shaft 19 becomes correspondingly greater until finally in the terminal position which is shown in Figure 3, the rotating body and the friction rim are concentric and the speeds of the driving and the driven shafts are the same.

The device can naturally be constructed differently. Thus for example the number of the levers 10 which are adjacently arranged will be adapted to the existing conditions, in particular the size of the gear and the torque to be transmitted, and in the same way also the number and the size of the rollers intended for the coupling, provided on the individual levers. The curved shape of the shoe 35 is adapted to the largest diameter of the friction rim. It rests against the bottom of the grooves in the rotating body. The groves themselves may be of rectangular cross-section. The arrangement of the rollers permits of an easy coupling and uncoupling, since the adjusting pressure always takes place radially and only the working pressure is directed tangentially. The working pressure also cannot react on the adjusting device, the adjusting device being on the contrary locked by the clamping effect of the rollers in the grooves. The foot 35 serves simply for guiding the revolving body 9 and not for the coupling. The coupling takes place as a result of the wedging action of the rollers 33 and shoes 35 in the grooves of body 9. This coupling and uncoupling is clearly illustrated in Figs. 8 to 11. The levers 10 are provided at their lower ends with a space 10a, Fig. 8. This space is provided on its bottom surface on which the rollers contact with a plurality of wave-like depressions 10b corresponding in number to the number of rollers. The rollers are held against the wave-like depressions by means of a spring wire 34 or the like, but the wire has a certain amount of elasticity so that the rollers can roll back and forth in their respective wave-like depressions. When the rollers are situated or reach the deepest part of their respective depression, as for instance indicated in full lines, Fig. 11, then the width of the back wall of the groove in the lever 10 will be smaller relative to the roller as for instance indicated by the distance or width $x$, that is the distance between the parts 9 will be somewhat smaller. When the levers 10 with the rollers have contacted the groove 36 at the periphery of the wheel 9, as indicated in Figs. 9 and 10, then a relative movement between the wheel 9 and the levers 10 will take place. In connection with this relative movement as indicated in Fig. 11 the roller 33 will be forced to assume the position indicated by the dash line, that is it will climb somewhat onto one side of the curve 10b. This will result in a wedging action of the roller of the levers 10 in groove 36 and a complete coupling will take place which will be all the more powerful as the turning movement increases. The arrangement is essentially what is known as a free running coupling or coaster brake or free wheeling device as utilized in connection with bicycle drives of which the construction and operation has been known for a long time.

Figure 6:
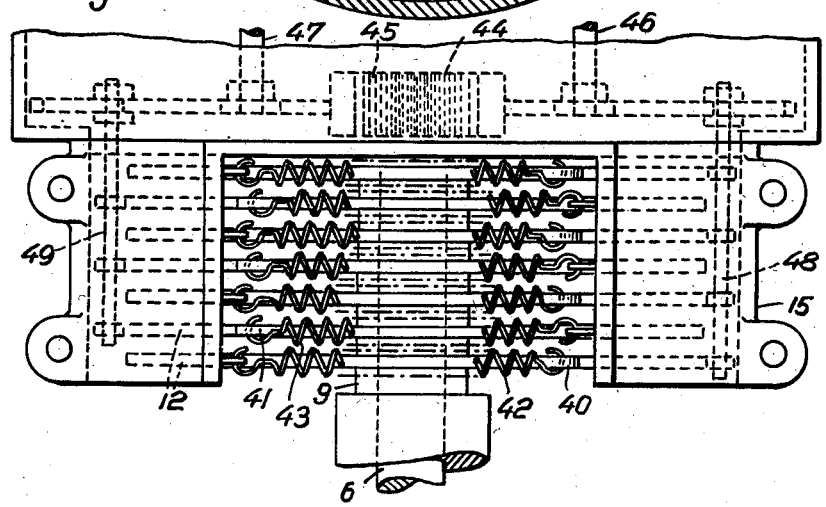
Figure 7:
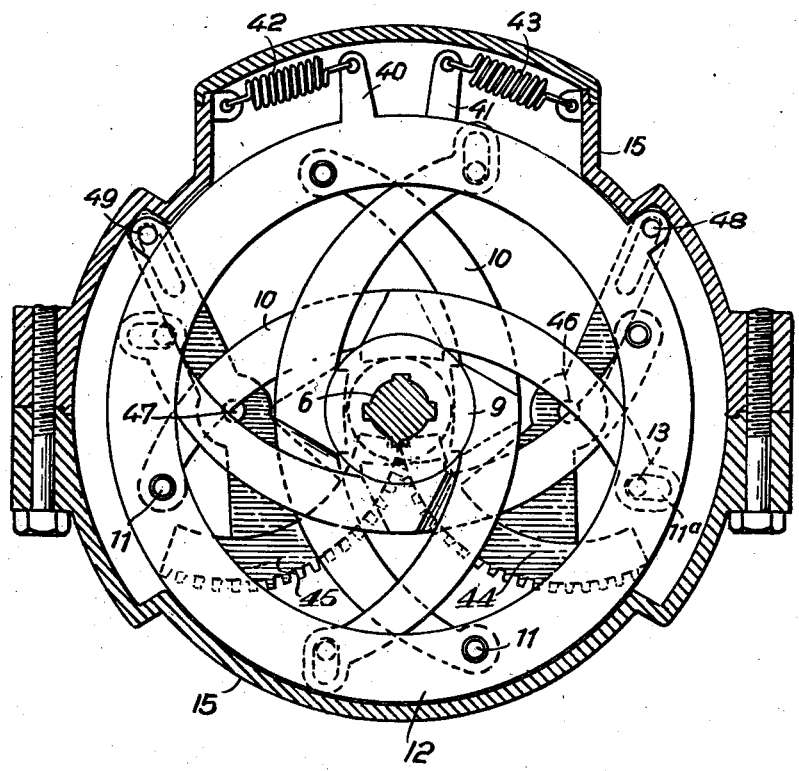

In Figures 5-7 is shown a further mechanism for the adjustment of the friction wheel. Here for the purpose of the rotation of the rings 12 and 14 with respect to each other, there is provided on each of the rings 12 a projection 40, and on each of the rings 14 a projection 41. On each of these projections there engages a spring 42 or 43 and the other ends of the springs are fixed on the housing 15. The springs tend to rotate the rings in opposite directions such that the friction shoes 33 provided on the arms 10 are moved towards the centre, that is, the friction rim is adjusted to the smallest diameter. If the friction wheel 9 is moved in the radial direction out of the position shown in Figure 7 into the position according to Figure 5, then the levers 10 with the friction shoes 33 are forced outward and thereby in consequence of the connection of the arms 10 with the rings 12 and 14, these are rotated oppositely into the position shown in Figure 5. The springs yield and are tensioned.

In order that the contrary movement of the two ring groups shall coincide exactly, there are provided in the housing two toothed segments 44 and 45 which are in engagement with each other and the point of engagement of which lies exactly in the central axis of the rings 12 and 14. The two segments are carried on pins 46 and 47 in the housing 15 or an adjacent fixed part of the machine. The segments have arms projecting outwardly over the periphery of the rings 12 and 14 and in which a pin or a driver or the like 48 or 49 is fixed. The pin 48 engages in holes which are provided on projections on the rings 12; and the pin 49 in holes on projections of the rings 14. If therefore for the adjustment of the transmission, the friction wheel 9 is moved in the radial direction and thereby a rotary movement is exerted on only one of the rings 12 or 14, this rotary movement is transmitted by the pins 48 and 49 and the intermediate toothed wheel segments 44 and 45 on to all the other rings, so that the rings of the one row must rotate uniformly in the one and the rings of the other series to the same extent in the opposite direction.

There is thus ensured an exact adjustment of the two ring series with respect to each other and also with respect to the rings of each group, and only a radial movement of the rotating body 9 is necessary for the adjustment of the gear.

The rings 12 and 14 can naturally also be carried in the housing 15 in such manner that they are held in an exactly concentric position. The device can be structurally varied.

I claim:

1. Continuously variable friction wheel gear comprising, in combination, a driving friction wheel having an unvariable diameter, and a driven friction wheel having a variable diameter, the outer surface of the driving wheel engaging the inner surface of the driven wheel and the driven friction wheel including friction shoes forming the rim of the wheel and arms on which said shoes are arranged, said arms being adapted to be shifted in the manner of an iris diaphragm to adjust the diameter of said driven friction wheel.

2. A gear according to claim 1, in which the arms are arranged in a number of layers parallel to each other and behind each other in the direction of their rotating axis, and the friction shoes provided thereon being located displaced with respect to each other in the sense of the circumference of the friction wheel including said shoes.

3. A gear according to claim 1, in which the arms are arranged in a number of layers parallel to each other and behind each other in the direction of their rotating axis and being bent so that the arms of a layer mutually overlap.

4. Continuously variable friction wheel gear comprising, in combination, two friction wheels the outer surface of one engaging the inner surface of the other, friction shoes forming the one of said friction wheels, arms on which said shoes are arranged, rotatable rings on which said arms are hinged, means for shifting the arms by the rotation of said rings in the manner of an iris diaphragm to adjust the diameter of the friction wheel formed by said shoes.

5. Continuously variable friction wheel gear comprising, in combination, two friction wheels engaging each other, a housing enclosing said wheels, one of said friction wheels including friction shoes and arms on which said shoes are arranged, two groups of rings rotatable in opposite directions respectively and on which said arms are hinged, means for shifting the arms by rotation of said groups of rings in opposite directions in the manner of an iris diaphragm to adjust the diameter of the friction wheel including said shoes.

6. A gear according to claim 5 wherein teeth are provided on the outer circumference of the rings, two toothed wheels carried in the housing and engaging the rings rotatable in the one and in the other direction respectively and a common toothed wheel adapted to adjust said two first mentioned toothed wheels in opposite directions.

7. Continuously variable friction wheel gear comprising, in combination with a housing, two friction wheels engaging each other and enclosed by said housing one of said friction wheels including, friction shoes and arms on which said shoes are arranged, means for shifting the arms in the manner of an iris diaphragm to adjust the diameter of the friction wheel including said shoes, approximately radially directed friction rollers carried by said friction shoes, curved support on said shoes on which said rollers run in the manner of an over-running coupling and flanges provided on the second of said friction wheels adapted to be engaged by said friction rollers and adapted to clamp the friction shoes between them.

8. A gear according to claim 5 wherein two toothed elements are journalled in the housing, the one being in connection with the one group and the other with the other group of rings and meshing together exactly in the central axis of the rings so that a rotation of the one ring group in the one direction must correspond to a rotation of the other ring group in the opposite direction.

9. A gear according to claim 5 in combination with two double armed levers, two journals on the housing arranged diametrically opposite to each other and carrying said levers and toothed segments provided on the ends of the levers turned towards each other and meshing with each other exactly in the central axis of the rings, the outer end of the one lever being connected with the rings of one group and the outer end of the other lever with the rings of the other group.

10. A gear according to claim 5 in combination with two double armed levers, two journals on the housing arranged diametrically opposite to each other and carrying said levers and toothed segments provided on the ends of the levers turned towards each other and meshing with each other exactly in the central axis of the rings, the outer end of the one lever being connected with the rings of one group and the outer end of the other lever with the rings of the other group and springs adapted to turn said groups of rings in one direction.

11. A gear according to claim 5 in combination with two double armed levers, two journals on the housing arranged diametrically opposite to each other and carrying said levers and toothed segments provided on the ends of the levers turned towards each other and meshing with each other exactly in the central axis of the rings, the outer end of the one lever being connected with the rings of one group and the outer end of the other lever with the rings of the other group and springs adapted to turn said groups of rings in the direction in which the friction wheel is adjusted at the smallest diameter.

MARTIN BERGER.